US010720695B2

(12) United States Patent
Yu et al.

(10) Patent No.: US 10,720,695 B2
(45) Date of Patent: Jul. 21, 2020

(54) NEAR FIELD COMMUNICATION ANTENNA MODULES FOR DEVICES WITH METAL FRAME

(71) Applicant: SPEED WIRELESS TECHNOLOGY INC., San Jose, CA (US)

(72) Inventors: Bin Yu, Suzhou (CN); Sile Gong, Suzhou (CN); Nana Li, Suzhou (CN); Yanmei Shi, Suzhou (CN)

(73) Assignee: SPEEDLINK TECHNOLOGY INC., Cupertino, CA (US)

( * ) Notice: Subject to any disclaimer, the term of this patent is extended or adjusted under 35 U.S.C. 154(b) by 53 days.

(21) Appl. No.: 15/595,738

(22) Filed: May 15, 2017

(65) Prior Publication Data

US 2018/0331416 A1  Nov. 15, 2018

(51) Int. Cl.
*H01Q 1/38* (2006.01)
*H01Q 9/02* (2006.01)
*H01Q 1/24* (2006.01)
*H01Q 5/335* (2015.01)
*H01Q 21/28* (2006.01)
*H01Q 5/314* (2015.01)
*H01Q 9/42* (2006.01)
*H01Q 1/36* (2006.01)
*H01Q 7/00* (2006.01)
*H04B 5/00* (2006.01)

(52) U.S. Cl.
CPC .............. *H01Q 1/243* (2013.01); *H01Q 1/36* (2013.01); *H01Q 1/38* (2013.01); *H01Q 5/314* (2015.01); *H01Q 5/335* (2015.01); *H01Q 7/00* (2013.01); *H01Q 9/42* (2013.01); *H01Q 21/28* (2013.01); *H04B 5/0025* (2013.01)

(58) Field of Classification Search
None
See application file for complete search history.

(56) References Cited

U.S. PATENT DOCUMENTS

| 6,018,319 | A * | 1/2000 | Lindmark | H01Q 9/0435 |
| | | | | 343/700 MS |
| 6,054,953 | A * | 4/2000 | Lindmark | H01Q 1/38 |
| | | | | 343/700 MS |
| 8,599,084 | B2 * | 12/2013 | Wong | H01Q 1/243 |
| | | | | 343/749 |
| 9,276,319 | B2 * | 3/2016 | Vazquez | H01Q 9/06 |
| 9,444,141 | B2 * | 9/2016 | Asrani | H01Q 1/243 |

(Continued)

*Primary Examiner* — Trinh V Dinh
(74) *Attorney, Agent, or Firm* — Womble Bond Dickinson (US) LLP

(57) ABSTRACT

A Near field communication (NFC) antenna and circuit modules are provided for communication terminal devices with metal frame, which aims at simplifying the implementation of the NFC antenna, and especially facilitating the application of the NFC for the devices with rear metal housing. The rear metal housing of a terminal device may be divided into three sections by the gap, the first section is metal frame, the second section is metal back shell. The metal frame as the main NFC antenna radiator, and also can be used as other microwave frequency antenna radiator. The rear metal shell connected to the motherboard ground. The NFC circuit module can transmit the NFC signal to the metal frame through different feeding methods to realize the radiation function of the NFC antenna.

11 Claims, 13 Drawing Sheets

(56) References Cited

U.S. PATENT DOCUMENTS

| | | | | |
|---|---|---|---|---|
| 2007/0268143 A1* | 11/2007 | Copeland | ............... | H01Q 1/22 |
| | | | | 340/572.7 |
| 2008/0191945 A1* | 8/2008 | Taki | ............... | H01Q 1/2225 |
| | | | | 343/700 MS |
| 2008/0204329 A1* | 8/2008 | Taki | ............... | H01Q 1/2225 |
| | | | | 343/700 MS |
| 2011/0291836 A1* | 12/2011 | Deavours | ............... | G06K 19/07773 |
| | | | | 340/572.7 |
| 2012/0299594 A1* | 11/2012 | Habara | ............... | G01R 33/34046 |
| | | | | 324/322 |
| 2014/0203991 A1* | 7/2014 | Yosui | ............... | G06K 19/07783 |
| | | | | 343/866 |
| 2015/0249292 A1* | 9/2015 | Ouyang | ............... | H01Q 21/30 |
| | | | | 343/702 |
| 2015/0311594 A1* | 10/2015 | Zhu | ............... | H01Q 13/10 |
| | | | | 343/702 |
| 2015/0372372 A1* | 12/2015 | Lee | ............... | H01Q 1/243 |
| | | | | 343/702 |
| 2016/0164182 A1* | 6/2016 | Lai | ............... | H01Q 13/106 |
| | | | | 343/905 |
| 2018/0269585 A1* | 9/2018 | Kim | ............... | H01Q 1/523 |

\* cited by examiner ent of the invention.

NEAR FIELD COMMUNICATION ANTENNA MODULES FOR DEVICES WITH METAL FRAME

FIELD OF THE DISCLOSURE

Embodiments of the present disclosure relate generally to the field of wireless communications, and more particularly, to near-field communication antenna modules for devices with metal frame peripheral structure.

BACKGROUND

In recent years, with the rapid development of consumer electronics products, especially Smartphone devices, tablet PCs, and other communication devices rapidly growth, products with an all-metal structure, an ultra-thin shape, good touch and excellent user experience become the necessary conditions for consumer electronics to occupy the market. The traditional plastic shell has become a representative of cheap products. For chasing higher profits, all-metal shell product design has become the demands of all mobile device companies. However, the introduction of all-metal design has brought unprecedented challenges to the antenna design. Especially for near-field communications antennas, an all-metal environment is susceptible to metal shielding and affects the quality of radiation.

Today, most of the solutions is to open an extra slit or opening on the rear camera hole of mobile devices. However, near-field communications antennas still adopt the way, that is, FPC coil covered with ferrite assemble into a near field communications (NFC) antenna. The antenna is placed around the rear camera hole or fingerprint identification hole, and one side spans the slit and is orthogonal to each other. This solution takes up a lot of space; the cost is high; and the camera slit processing destroys the integrity of the device's shell.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Figure 1:
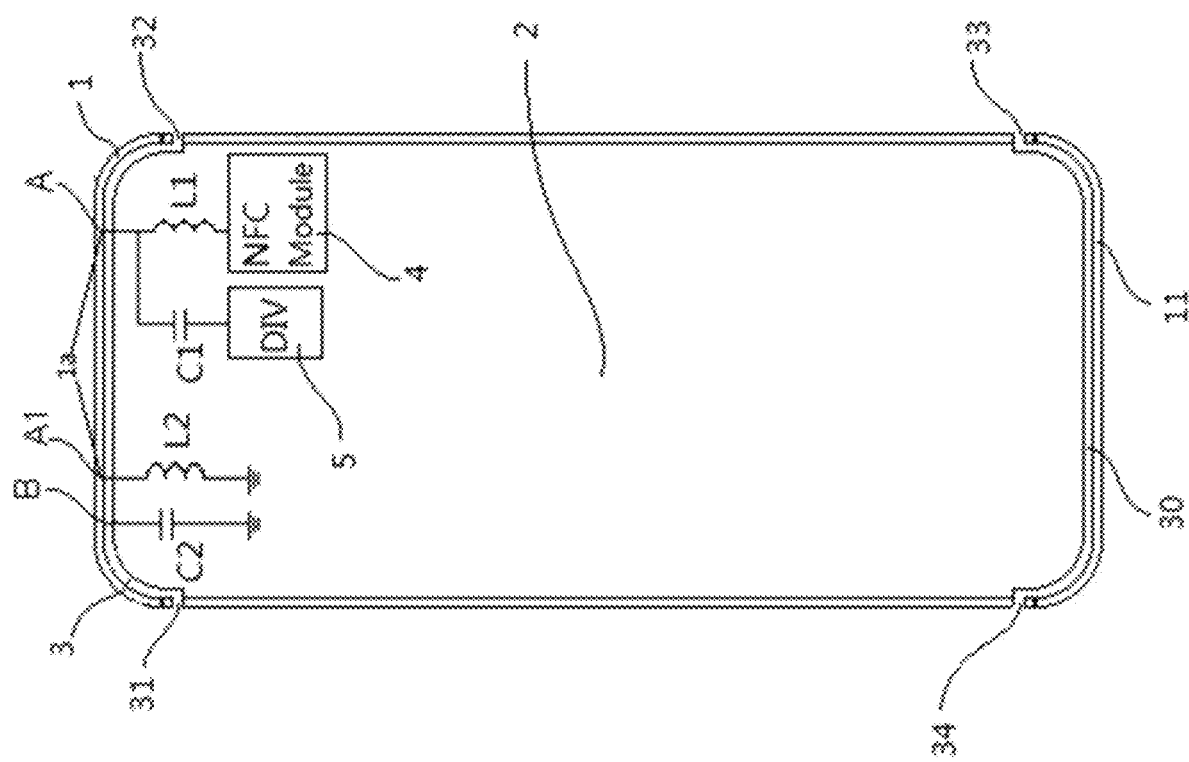
FIG. 1 is one of the structural diagrams of the near-field communication antenna module according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

Embodiments of the invention utilize a metal frame of the device as a radiation body of an NFC antenna, abandoning the traditional way of supplying a FPC coil and ferrite. It not only makes the cost more affordable, but also frees up more internal space for other functional designs. No extra slit design is required on the device's rear shell, making the product more integrate and beautiful. In one embodiment, an NFC antenna has various feeding methods, which can be fed directly and also can be coupled feed, which has a greater design flexibility.

Embodiments of the invention provide an antenna module solution applied to the field of near-field communication. The solution is suitable for mobile devices with a metal frame, especially for mobile devices with an all-metal rear cover. By sharing the metal frame the device to achieve the electromagnetic radiation function of the near-field antenna and the microwave frequency antenna, a variety of antenna feeding methods can be selected, which makes the design more flexible.

The periphery metal frame or metal housing of the devices may be divided into three sections: an upper section, a middle section, and a lower section by openings. A gap is filled between the upper and the middle sections, where the gap width is at least 1.5 millimeters (mm). The device includes an NFC module and a microwave frequency communication module, which can perform a near-field communication function and a wireless communication function respectively, such as cellular communication, WiFi and global positioning system (GPS) function.

In one embodiment, an NFC antenna module includes an NFC radiation antenna and an NFC circuit module. The NFC module and the microwave frequency communication module may share an upper metal frame as a radiation antenna. The effective radiation length of the NFC antenna is determined by the position of a feed point and a ground point.

The feeding method of the NFC antenna includes direct feed with a conductor connection, coupling feed with a non-contact metal sheet, and coupling with the rear metal housing gap by using a non-balanced antenna. When feeding directly, a low loss high-Q inductor L1 is connected in series between the upper metal frame and the NFC circuit module, and far away from the inductor L1 position, another high Q inductor L2 is connected in series between the upper metal frame and a motherboard ground. The function of inductors L1 and L2 not only can enhance the NFC antenna path's inductance, but also isolate the interference of other high-frequency signals to the NFC circuit module.

When using a coupling feed, the NFC circuit module transmits a signal to a metal sheet. The magnetic field energy produced by the metal sheet causes the upper metal frame to induce an eddy current signal, thus achieving the purpose of feeding. The coupling metal is arranged in parallel with the upper metal frame and the insulating material is filled between them. Two high-Q inductor L1 and L2 are connected with the metal sheet, wherein the other end of inductor L1 is used to connect the NFC circuit module for feed. The other inductor L2 used to connect the motherboard ground layer.

There is a clearance area between the motherboard ground layer and the coupling feed metal sheet. When the non-balanced antenna is used to feed the metal gap, the non-balanced antenna component is arranged directly above the gap. At least one trace line of the antenna is orthogonal with the gap, and the end of the antenna pattern is connected to the near-field antenna circuit module and the other end is grounded. When the NFC circuit module transmits signals to the non-balanced antenna, a varying magnetic field is generated in the surroundings. The electromagnetic energy is coupled to the gap of the metal rear housing, so that the potential difference is formed on both sides of the gap, and the eddy current is obtained on the rear metal housing to have the near-field communication capability of the terminal device.

The grounding method of the NFC antenna is optional. One way is to share the grounding position with the microwave antenna, directly connect to the ground of the motherboard. The other way is grounding respectively at different positions, in order to distinguish the grounding position for signals of different frequency bands. The NFC antenna needs to connect with a high inductance inductor in series to isolate other high-frequency bands signals. The other high-frequency antenna needs to connect with a high-capacity capacitor before grounding to isolate low-frequency band NFC signals.

The NFC circuit module comprises a near-field communication chip, a differential LC low-pass filter circuit, a balance and unbalance (balun) conversion device, and a non-differential impedance matching circuit in sequence. Wherein, the balun, as a balanced and unbalanced conversion device, contains fourth ports. Two input ports core connected to a LC low-pass filter circuit. One output port is grounding. The other output port is connected to the capacitor Cs in series, which is part of the non-differential impedance matching circuit. The other part of the non-differential impedance matching circuit is a capacitor Cp in parallel. One end of parallel capacitor Cp connects to the series capacitor Cs and the other end of capacitor Cp connects to the high-Q inductor L1, which can be connected to the upper metal frame directly, connected to the coupling metal sheet by a microstrip to realize the coupling feed, or connected to the non-balanced antenna which is arranged above the gap of metal rear shell to realize aperture coupled feeding. A point is selected on the metal frame as a grounding point of NFC antenna, which is far from the feeding position, connected to the motherboard ground through a high-Q inductor L2.

The microwave bands antenna module and the NFC antenna module share the upper metal frame of the device as a radiator. The microwave bands antenna circuit module is connected to a high-capacity capacitor C1 before microwave bands signals transmit to the upper metal frame. The microwave bands antenna circuit module is connected to another high-capacity capacitor C2 before the antenna is connected to the ground. The role of C1 and C2 is to isolate the interference of the NFC signal to the microwave bands signals.

The embodiments of the invention, as compared with the conventional technology, have certain advantages. The NFC antenna does not require conventional FPC coil attached with ferrite material, which has a competitive cost advantage. Sharing the upper metal frame antenna radiator with a microwave bands antenna module can save more internal space, the miniaturization of the antenna, and make the devices more thinner and lighter than before. There is no need for additional slits in the middle metal back cover, such as slot on the camera hole, which simplifies the difficulty of processing.

Especially, in one embodiment, the NFC antenna module has a variety of ways for feeding, including feed by direct contact, coupling feed by a metal sheet, and aperture-coupled feed by using a non-balanced antenna. The choice of feed form is free and the design flexibility is higher.

FIG. 1 is a structural diagram of a near-field communication antenna module according to one embodiment. Referring to FIG. 1, a metal housing of the device may be divided into two sections by gap 3, including the upper metal frame 1 and the middle metal shell 2, wherein the upper metal frame 1 serves as an antenna radiating element and is generally used to radiate electromagnetic waves to air space. The middle section metal shell 2 is usually used as a shielding and heat dissipation layer. The gap 3 between the metal frame 1 and the middle section metal shell 2 is filled with insulating medium, where the gap width of gap 3 is at least 1.5 mm.

As shown in FIG. 1, the near-field communication module and the microwave frequency module share the upper metal frame 1 as an antenna radiator. The microwave antenna module comprises the microwave antenna 1 and a microwave circuit module 5. The microwave antenna can work in different frequency bands, including diversity antenna (working frequency is usually at GSM, LTE bands), GPS, WIFI and other bands, which working frequency bands is above 700 megahertz (MHz). The near-field communication module comprises an NFC antenna 1a and an NFC circuit module 4. The NFC antenna's working frequency band may be around 13.56 MHz.

In this embodiment, the NFC antenna and the diversity antenna share the same feeding point A. The diversity circuit module 5 feeds the diversity antenna. The NFC circuit module feeds the NFC antenna. Different reactance elements are connected to the two modules respectively before feeding to the antenna. NFC circuit module 4 through a high-Q inductance element L1 is connected to point A of upper metal frame 1. The diversity circuit module 5 through a high-capacity capacitor C1 is connected to point A of upper metal frame 1. The A1 point on the metal frame 1 is a grounding point of the NFC antenna. A high-Q inductance element L2 is connected between the A1 point and the motherboard ground. The point B on the metal frame is a grounding point of the diversity antenna. A high-capacity capacitor C2 is connected in series between the point B and the motherboard ground.

Relatively, the NFC module 4 handles low frequency band signals and the diversity module 5 handles high frequency band signals. Conductors with a high inductor in a low frequency band represents the conduction state, while a high frequency band is equivalent to an open state. On the contrary, the high-capacity capacitors in the low frequency band represent the open state, and the high frequency band is equivalent to the conduction state. Thus, the function of the reactance elements L1, L2, C1, C2 is to isolate the diversity signals and the NFC signals, so that the two modules 4 and 5 working without being affected by the each other.

Figure 2:
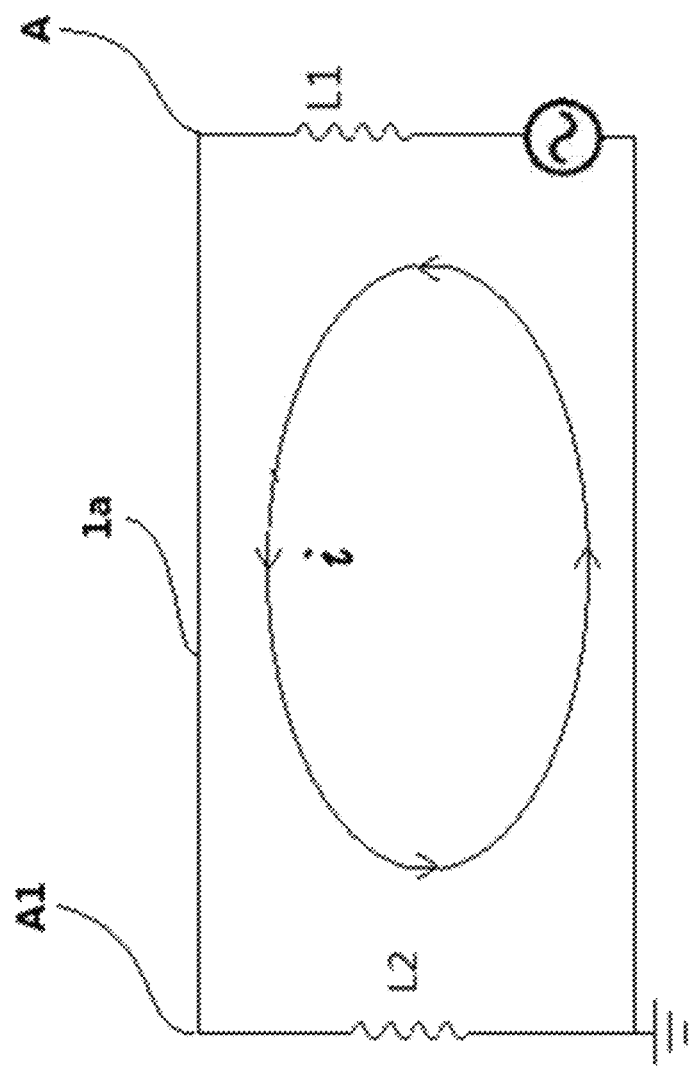
FIG. 2 is an equivalent circuit diagram of the realization of near-field antenna function according to one embodiment of the invention.

FIG. 2 shows the equivalent circuit of the near-field antenna according to one embodiment. The inductors L1 and L2 are equivalent to a conductive state for the NFC and capacitors C1 and C2 are equivalent to an open state for the NFC signals. The NFC signal cannot pass through C1 and C2. Therefore, the feeding and grounding positions of the diversity module will not have an impact on the NFC signal flow path.

Figure 3:
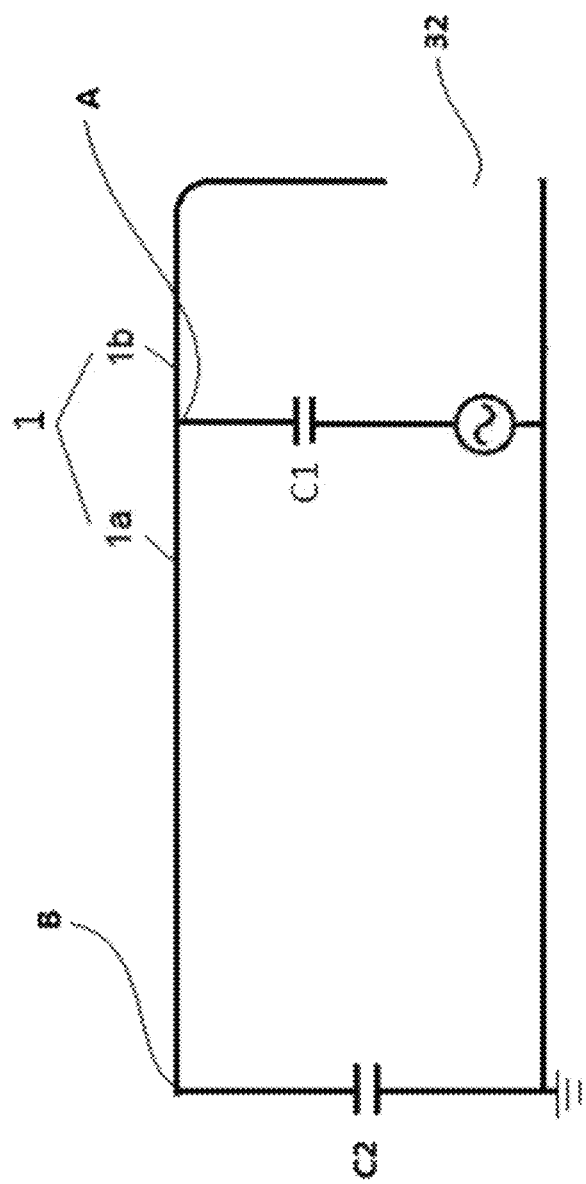
FIG. 3 is an equivalent circuit diagram of the realization of microwave antenna function according to one embodiment of the invention.

FIG. 3 shows the equivalent circuit of the microwave frequency antenna according to one embodiment. The inductors L1 and L2 are equivalent to the open state for diversity signals, and capacitors C1 and C2 are equivalent to the conductive state for diversity signals. The diversity current signals cannot pass through the inductors L1 and L2. When the diversity module is active, the flow path of the diversity current signals do not change due to the feeding and grounding positions of the NFC module.

Referring to FIG. 2, the NFC circuit module feeds the NFC antenna 1a, which is a part of the metal frame 1. A high-Q inductance element L2 is connected in series between them. The current flows through the radiator 1a to the grounding point A1, and then flows to the motherboard ground through the series inductor L2. By forming a ring circuit structure, the ring circuit structure radiates magnetic field to achieve an NFC function.

Referring to FIG. 3, the diversity module feeds the diversity antenna and connects to the metal frame 1 through the capacitance element C1, where the left side 1a of the feeding point A is connected to the ground through the series capacitor C2, forming a loop. The right side 1b of the feeding point A extends to the metal frame opening edge 32, forming an open state. The metal arms 1a and 1b with different length can achieve the radiation of different microwave frequency band signals.

Figure 4:
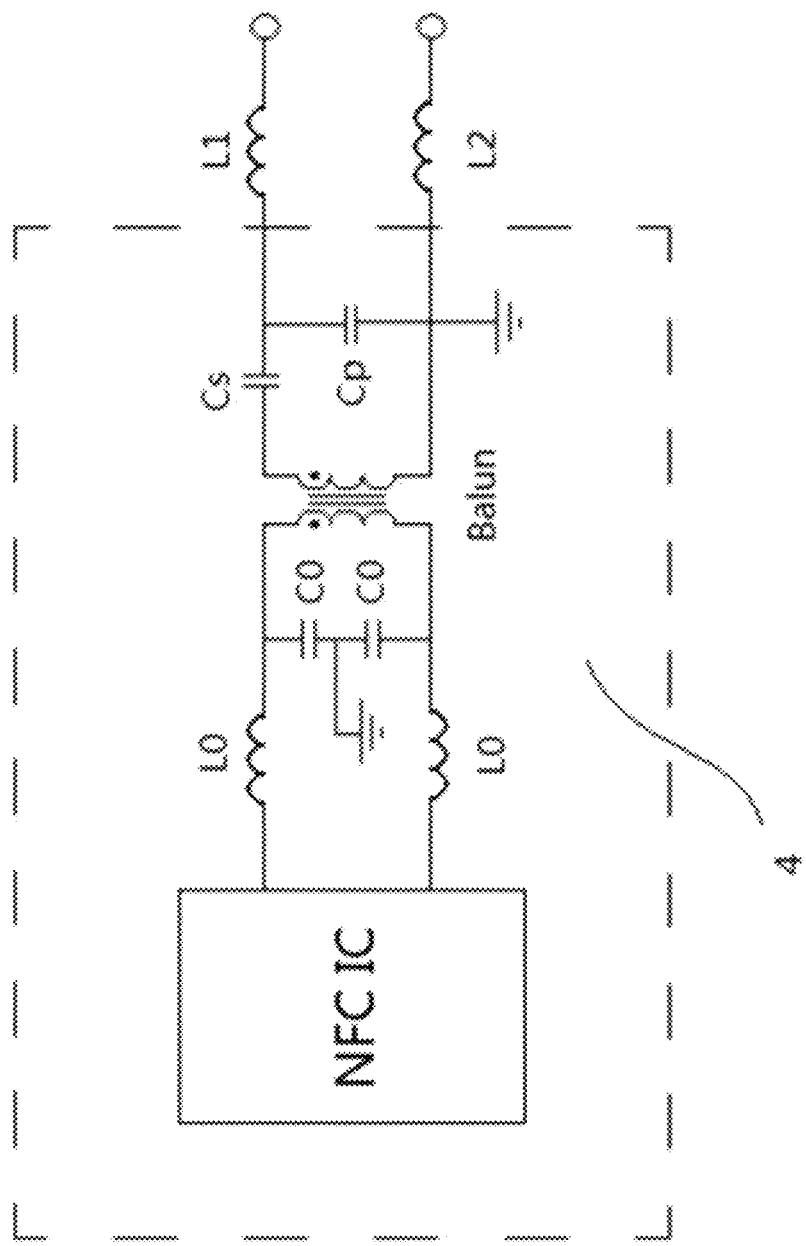
FIG. 4 is a schematic diagram of the electrical connection of the NFC circuit module according to one embodiment of the invention.

FIG. 4 is a schematic diagram of the electrical connection of the NFC circuit according to one embodiment. The NFC circuit module 4 includes an NFC IC chip, a differential LC low-pass filter circuit, a balun, and a non-differential impedance matching circuit, where all of them are connected in sequence or series. The differential LC low-pass filter circuit includes inductors L0 and shunt capacitors C0 in series. The non-differential impedance matching circuit includes capacitor Cs and shunt capacitor Cp in series. The Cp is grounded at one end and the other end is connected to the capacitor Cs in series. The balun, as balanced and unbalanced conversion device, contains 4 ports, where two input ports are connected to the LC low-pass filter circuit, one output port is grounding, the other output port connected to the capacitor Cs in series. One end of the high-Q inductor L1 is connected to the non-differential impedance matching circuit, while the other end of the L1 is connected to the metal frame 1 to realize feeding directly.

According to another embodiment, the difference from the embodiment described above is that the feeding form of the NFC circuit module to the metal frame 1 is not fed directly but fed by magnetic energy coupling through a metal sheet.

Figure 5:
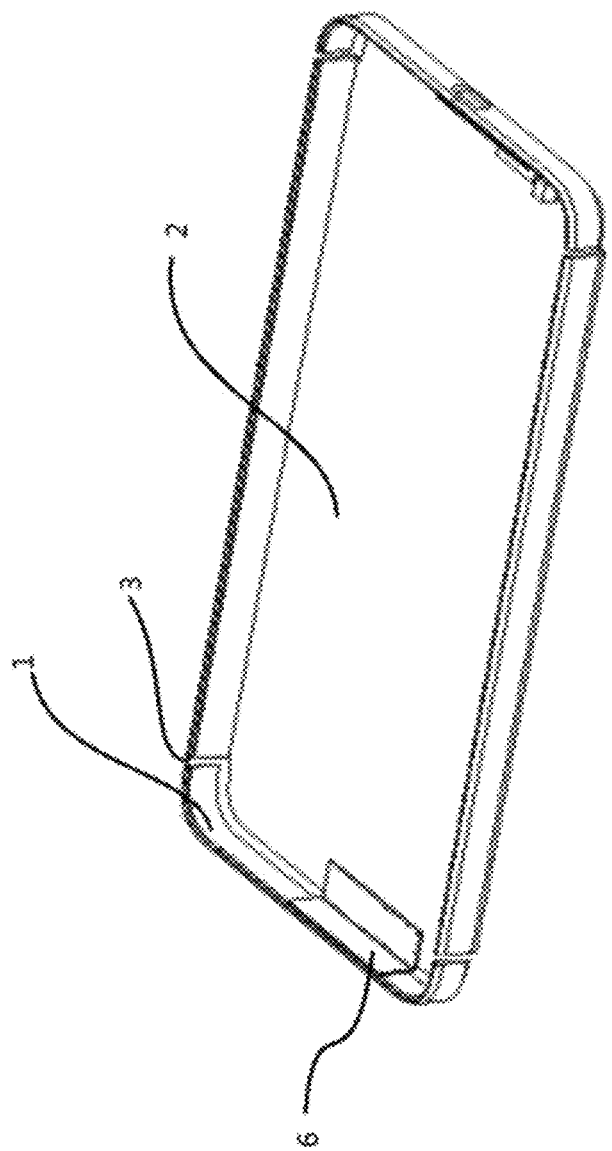
FIG. 5 is a structure diagram of an illustrative how to realize NFC antenna by using coupling feed assembly according to another embodiment of the invention.
Figure 6:
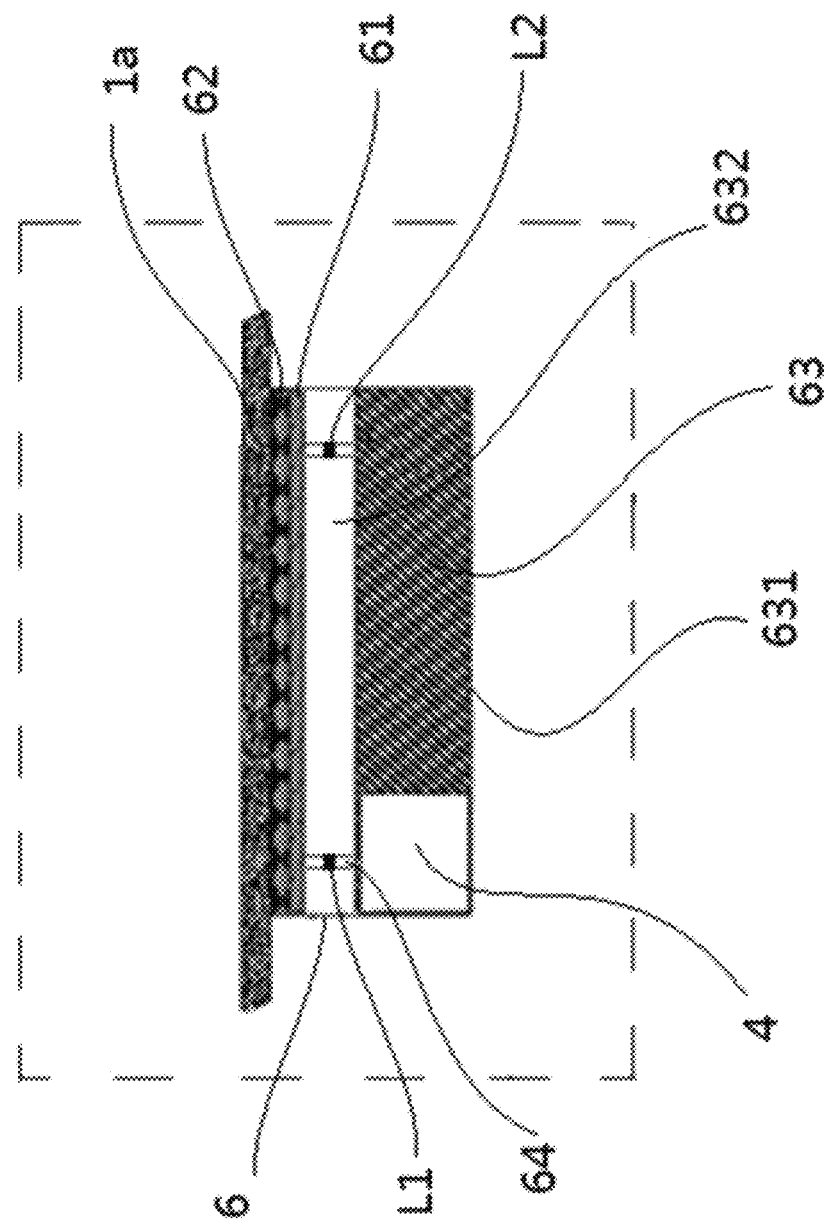
FIG. 6 is a cross-sectional view of the coupling feed assembly according to another embodiment of the invention.

FIG. 5 is a structure diagram of an illustrative how to realize NFC antenna by coupling feed assembly according to one embodiment. FIG. 6 is a cross-sectional view of the coupling feed assembly according to one embodiment. The coupling feed assembly 6 includes coupling feed sheet 61, an insulating portion 62, a NFC circuit module 4, a coupling feed board portion 63, and microstrip line 64. The coupling feed main board portion 63 includes a ground plane 631 and a clearance plane 632. The coupling feed sheet 61 is disposed in with the metal frame antenna radiator 1a and is not in contact. The spacing between them is than 1.5 mm and filled with insulating medium 62. The NFC circuit module 4 is connected to the high-Q value inductor L1, and the other end of inductor L1 is connected to the coupling sheet 61 by an approximately 50 ohm microstrip line 64. On the other end of the same side of the coupling feed sheet 61, the high-Q inductor L2 is connected via the microstrip line, and other end of the inductor L2 is connected to the ground plane 631. The inductors L1 and L2 operate to isolate the microwave frequency signals on the radiating element 1a. The clearance plane 632 of the coupling feed main board portion 63 is used to prevent microwave signals the NFC signals in the metal frame radiator 1 from entering the ground plane 631 directly.

Figure 7:
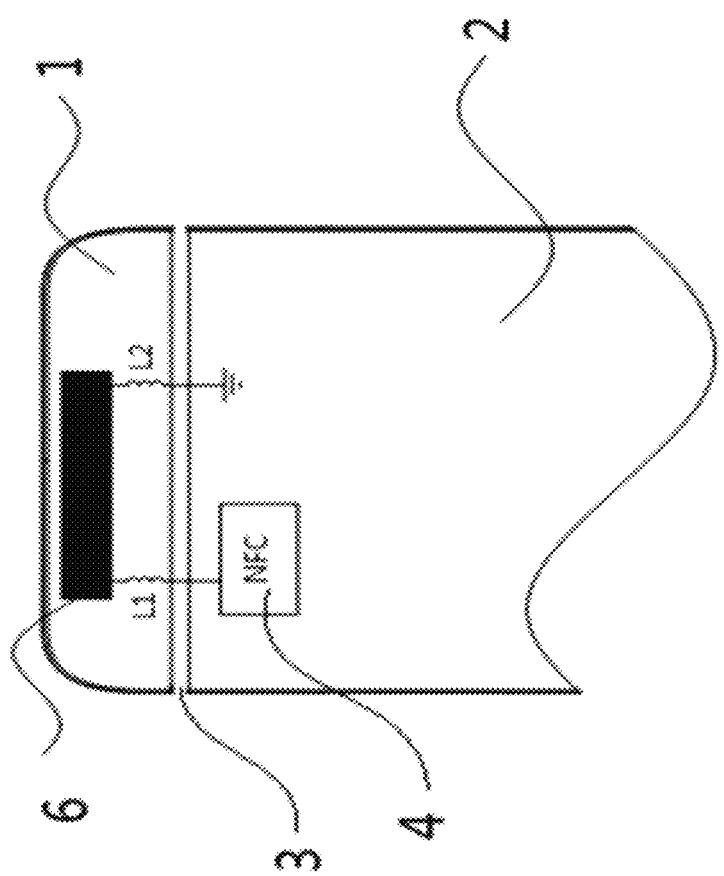
FIG. 7 is a structural form diagram showing the coupling feed components how to connect to each other according to another embodiment of the invention.
Figure 8:
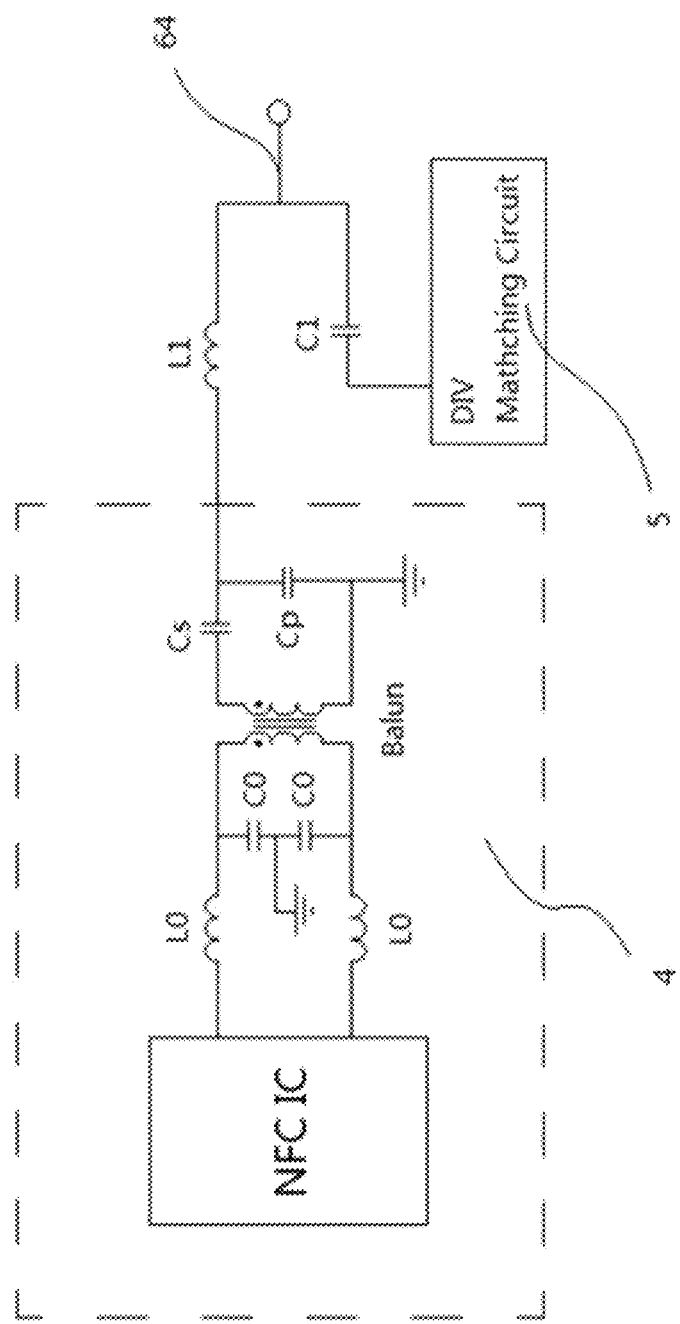
FIG. 8 is a schematic diagram of the electrical connection of the NFC circuit module when using coupling feed according to another embodiment of the present invention.

FIG. 7 is a structural form diagram of the coupling feed components are connected to each other according to one embodiment. FIG. 8 is a schematic diagram of the electrical connection of the NFC circuit module when using coupling feed according to one embodiment. The microstrip line 64 is connected in series to the high-Q isolation inductor L1 and the other end of the inductor L1 is connected to the NFC circuit module 4. While the microstrip line 64 is also connected to the microwave band antenna via an isolation capacitor C1, such as a matching circuit 5 of the diversity antenna. The internal electrical connection of the NFC circuit module 4 is the same as that one described above.

Figure 9:
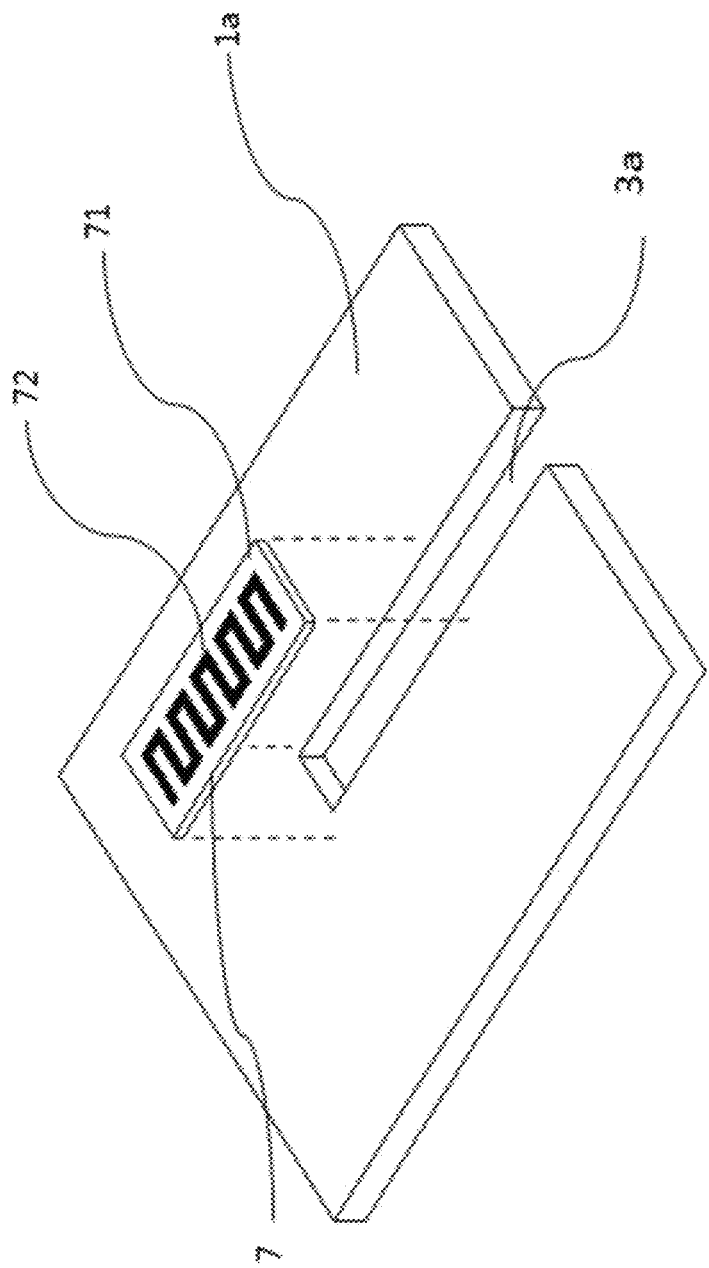
FIG. 9 is a perspective exploded view of feeding assembly of the near-field antenna according to another embodiment of the invention.

According to a further embodiment, an unbalanced antenna is utilized to couple the gap to feed the NFC antenna. As shown in FIG. 9, a slot-coupled feed NFC antenna assembly includes a metal frame 1a, a metal rear shell 2 and an unbalanced antenna element 7. A gap 3 is provided between the metal frame 1a and the metal rear shell 2, and the gap may be a half-open gap 3a. The unbalanced antenna element 7 is disposed directly above the half-open slot 3a, and it includes a dielectric substrate layer 71 and an unbalanced antenna pattern 72 attached to the dielectric substrate layer 71. The unbalanced antenna pattern 72 is serpentine multi-fold shape and is orthogonally coupled to the half-open gap 3a.

Figure 10:
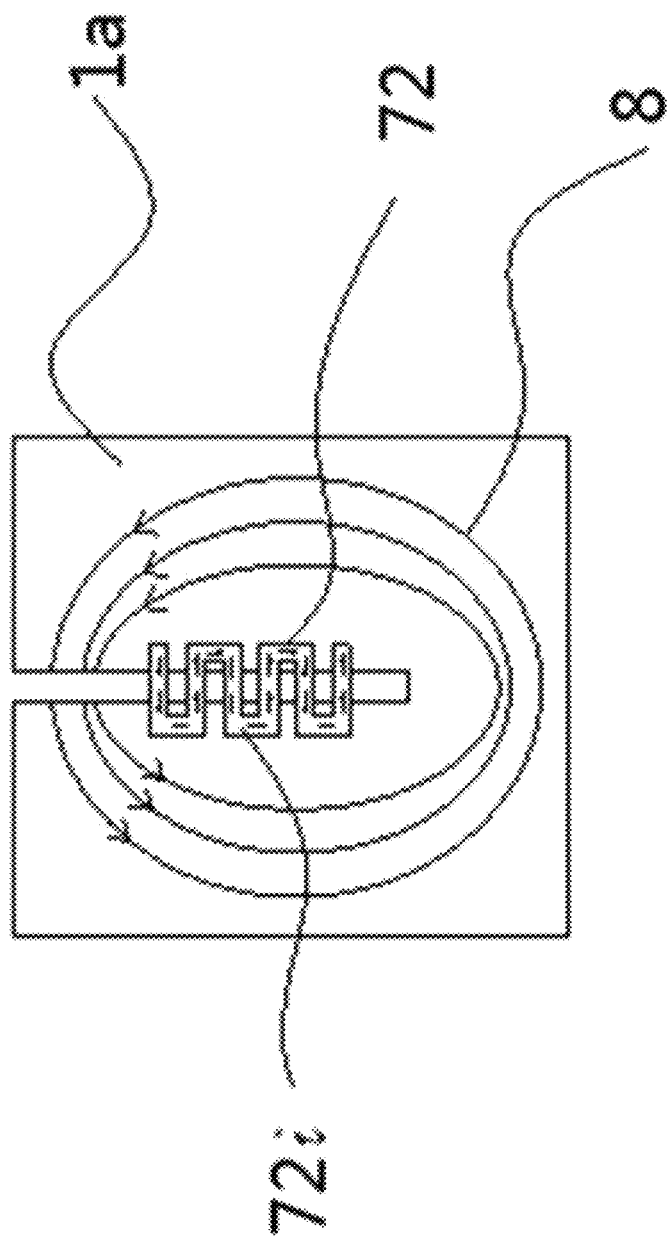
FIG. 10 shows one kind of the current flow direction diagram of feeding assembly of the near-field antenna according to another embodiment of the invention.
Figure 11:
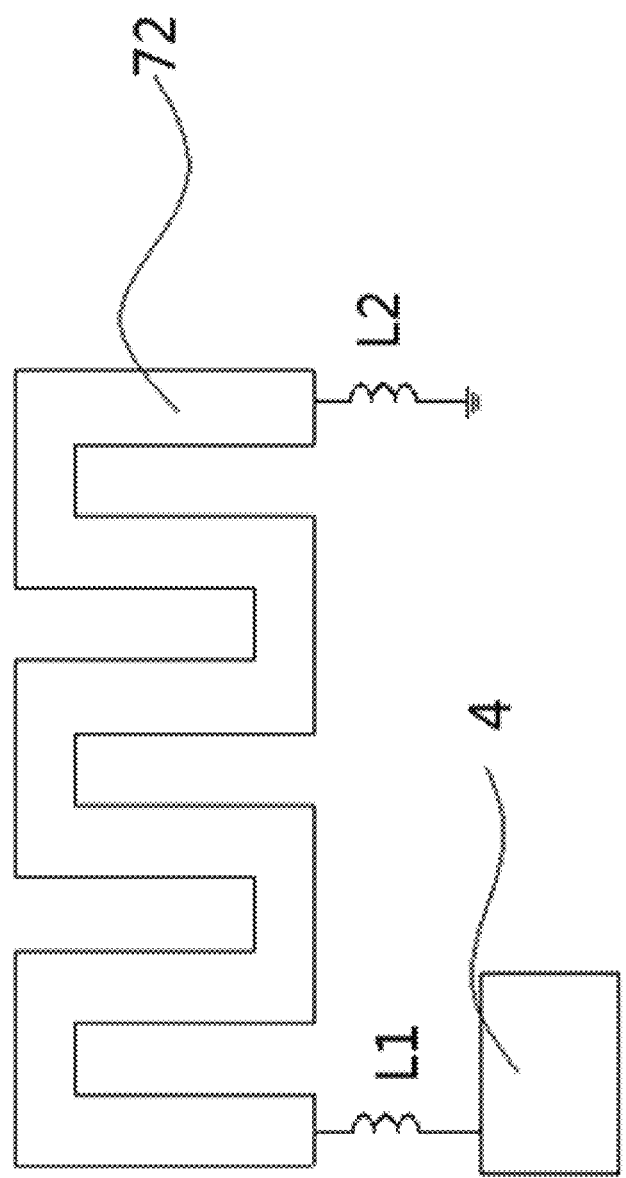
FIG. 11 is a circuit connection diagram of feeding assembly of the near-field antenna according to another embodiment of the invention.

As shown in FIG. 10, one end of the unbalanced antenna pattern 72 with multi-fold shape is connected to the NFC antenna circuit module 4 through the high-Q L1, and the other end is grounded through the high-Q inductor L2. As shown in FIG. 11, the antenna pattern 72 is orthogonal to the half-open gap 3a in which the current 72i of the NFC signals on the unbalanced antenna pattern 72 is coupled to the gap 3a orthogonally, A difference is formed on both sides of the slit 3a, so that the eddy current 8 is formed on the plane, and the presence of the eddy current 8 makes the metal plane on both sides of the slit have near field communication capability.

Figure 12:
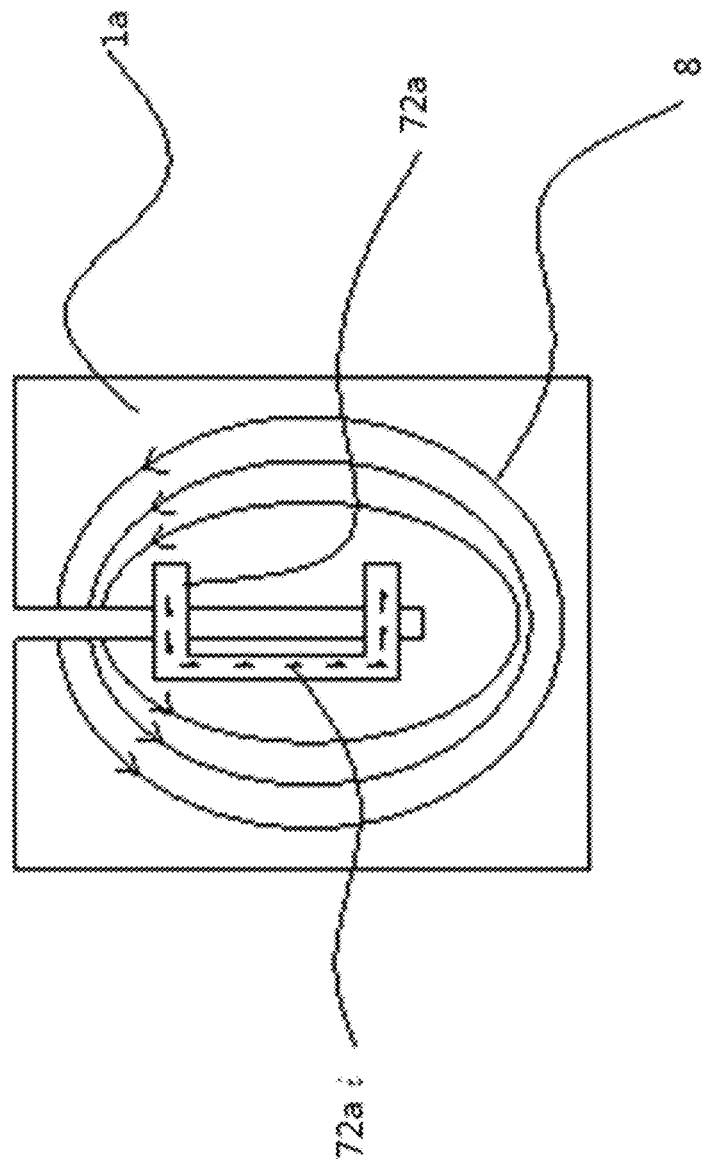
FIG. 12 shows one kind of the current flow direction diagram of feeding assembly of the near-field antenna according to another embodiment of the invention.
Figure 13:
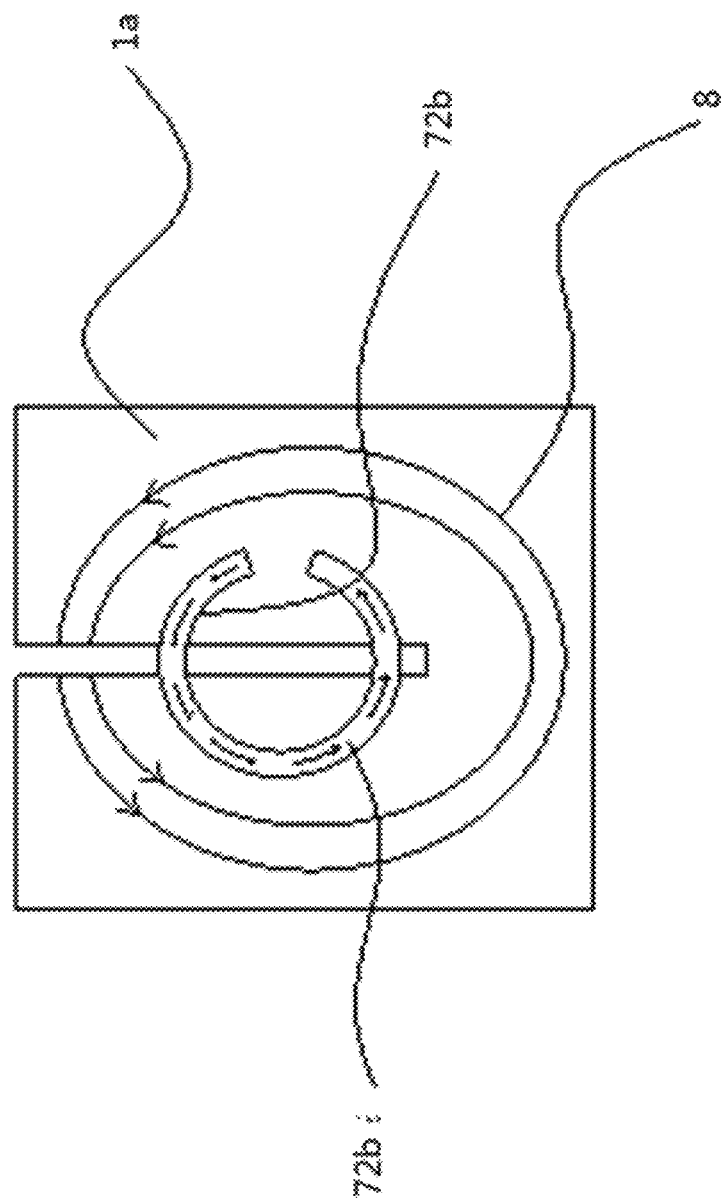
FIG. 13 shows one kind of the current flow direction diagram of feeding assembly of the near-field antenna according to another embodiment of the invention.

It should be noted that, as shown in FIG. 12 and FIG. 13, the shape of the unbalanced antenna pattern may be not only a serpentine multi-fold shape but also a "⊏" type structure, a "C" type semi-circular ring structure, and the like. The gap between the metal frame 1 and the metal rear shell 2 may be full open or half-open.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A wireless communication device, comprising:
   a near field communications chip (NFC) antenna module;
   a microwave frequency antenna module; and
   a metal frame peripheral structure having one or more openings disposed on a top metal border of the metal frame peripheral structure, wherein the one or more openings are to divide the metal peripheral structure into two sections, including an upper metal frame and a middle rear shell, wherein the middle rear shell is made of metal or non-metallic material, wherein when the middle rear shell is made of metal, a gap is formed between the upper metal frame and the middle rear shell, and wherein a width of the gap is at least 1.5 millimeters (mm) wide,
   wherein a portion of the upper metal frame is used as a radiator for the NFC antenna module and the microwave frequency antenna module, wherein the portion of the upper metal frame is connected to a ground through a conductor, wherein an effective length of the NFC antenna module is determined by a length between a feeding point position and a grounding point position of the NFC antenna module, and
   wherein the NFC antenna module comprising a feeding path for feeding, the feeding path comprising a non-balanced antenna element having portions of an antenna pattern orthogonal to a length of the gap, wherein the non-balanced antenna element includes a serpentine multi-fold shaped antenna pattern.

2. The device of claim 1, wherein the NFC antenna module comprises the upper metal frame as a radiator, a ground path, some reactive elements, and an NFC circuit module.

3. The device of claim 1, wherein the microwave frequency antenna module comprises a radiator made of the upper metal frame, a ground path, one or more reactive elements, and a microwave frequency circuit module.

4. The device of claim 2, wherein a first end of the non-balanced antenna element is coupled to the NFC circuit module and a second end is coupled to the ground path.

5. The device of claim 4, wherein the feeding path includes a direct feeding path for direct feeding, wherein during the direct feeding,
   a first point is selected on the upper metal frame as a feeding point, wherein the feeding point is directly connected to a first end of a first inductor and a second end of the first inductor is connected with the NFC circuit module; and
   a second point is selected on the upper metal frame as a grounding point of the NFC antenna module, wherein the grounding point is directly connected with a second inductor, wherein the second inductor is coupled to a circuit board ground and is coupled to the middle rear shell of the device.

6. The device of claim 4, further comprising a coupling feeding module for feeding by non-contact metal sheet coupling, wherein the coupling feeding module comprises:
   a coupling feeding metal sheet; and
   a coupling feeding circuit board, wherein the coupling feeding metal sheet is arranged in parallel with the upper metal frame with each other with a layer of insulating substrate between them, wherein the coupling feeding metal sheet is connected to the NFC circuit module through a first inductor, wherein the coupling feeding circuit board comprises a ground layer and a clearance area between the ground layer and the coupling feed sheet, wherein within the clearance area, a second inductor is used to connect the coupling feed sheet and the ground layer, wherein the second inductor is to further filter out high-frequency signals to enhance NFC signal's quality.

7. The device of claim 4, further comprising a non-balanced antenna assembly, wherein the non-balanced antenna assembly comprises a dielectric substrate layer and an antenna pattern attached on the dielectric substrate layer, which is arranged directly above the gap, wherein at least one side of an antenna trace is orthogonal coupled with the gap, wherein a first end of the antenna trace is connected to the near-field antenna module and a second end of the antenna trace is connected to a ground, wherein the non-balanced antenna assembly is used to couple the gap so that a potential difference is formed on both sides of the gap, and wherein an eddy current is obtained on a rear metal cover to realize the near-field communication capability of the device.

8. The device of claim 7, wherein the antenna pattern includes a "C" type semicircular ring shape or a "⊏" type structure.

9. The device of claim 2, wherein the NFC circuit module comprises: a near-field communication chip, a differential LC low-pass filter circuit, a balance and unbalance conversion device, a non-differential impedance matching circuit, and an isolation inductor coupled in series to the NFC circuit module.

10. The device of claim 9, wherein the balance and unbalance conversion device includes a balun with dual input and single output port settings, whereon a second output port is grounded, wherein the balun is placed between the differential LC low-pass filter circuit and the non-differential impedance matching circuit to achieve the conversion from a balanced circuit to the unbalanced circuit.

11. The device of claim 1, further comprising a first capacitor and a second capacitor respectively connected to a microwave frequency circuit module and a ground layer, wherein the capacitors are used to isolate an interference of NFC signals to the microwave frequency circuit module.

\* \* \* \* \*